US008046229B2

(12) United States Patent
Bradley et al.

(10) Patent No.: US 8,046,229 B2
(45) Date of Patent: Oct. 25, 2011

(54) METHOD AND APPARATUS FOR WEBSITE NAVIGATION BY THE VISUALLY IMPAIRED

(75) Inventors: Nathan T. Bradley, Tucson, AZ (US); David Ide, Tucson, AZ (US)

(73) Assignee: Audioeye, Inc., Tucson, AZ (US)

( * ) Notice: Subject to any disclaimer, the term of this patent is extended or adjusted under 35 U.S.C. 154(b) by 0 days.

(21) Appl. No.: 12/637,512

(22) Filed: Dec. 14, 2009

(65) Prior Publication Data
US 2010/0095210 A1 Apr. 15, 2010

Related U.S. Application Data

(63) Continuation of application No. 10/637,970, filed on Aug. 8, 2003, now Pat. No. 7,653,544.

(51) Int. Cl.
*G10L 21/00* (2006.01)

(52) U.S. Cl. ............... 704/270.1; 705/319; 709/224; 709/217; 709/203; 709/247; 709/218; 715/733; 715/205

(58) Field of Classification Search ............... 704/270.1; 709/224, 217, 203, 247, 219, 218, 202; 705/319; 715/733, 205
See application file for complete search history.

(56) References Cited

U.S. PATENT DOCUMENTS

| | | | | |
|---|---|---|---|---|
| 5,918,223 A | * | 6/1999 | Blum et al. ........................ 1/1 |
| 5,991,781 A | * | 11/1999 | Nielsen ........................ 715/236 |
| 6,092,039 A | * | 7/2000 | Zingher ........................ 704/221 |
| 6,240,448 B1 | * | 5/2001 | Imielinski et al. ............ 709/218 |
| 6,606,374 B1 | * | 8/2003 | Rokoff et al. ............ 379/88.16 |
| 6,742,021 B1 | | 5/2004 | Halverson et al. |
| 6,934,684 B2 | * | 8/2005 | Alpdemir et al. ............ 704/265 |
| 7,106,220 B2 | * | 9/2006 | Gourgey et al. ................ 341/27 |
| 7,124,366 B2 | * | 10/2006 | Foreman et al. ............ 715/719 |
| 7,174,293 B2 | * | 2/2007 | Kenyon et al. ................ 704/231 |
| 7,194,752 B1 | * | 3/2007 | Kenyon et al. ................ 725/22 |
| 7,219,136 B1 | | 5/2007 | Danner et al. |
| 7,284,255 B1 | * | 10/2007 | Apel et al. ........................ 725/18 |
| 2002/0003547 A1 | * | 1/2002 | Wang et al. ................ 345/727 |
| 2002/0007379 A1 | * | 1/2002 | Wang et al. ................ 707/515 |
| 2002/0010584 A1 | | 1/2002 | Schultz et al. |
| 2002/0023020 A1 | * | 2/2002 | Kenyon et al. ................ 705/26 |
| 2002/0065658 A1 | * | 5/2002 | Kanevsky et al. ............ 704/260 |
| 2002/0074396 A1 | * | 6/2002 | Rathus et al. ................ 235/380 |
| 2002/0124020 A1 | * | 9/2002 | Janakiraman et al. ........ 707/513 |
| 2002/0198705 A1 | * | 12/2002 | Burnett ........................ 704/214 |
| 2003/0033434 A1 | | 2/2003 | Kavacheri et al. |
| 2003/0115546 A1 | | 6/2003 | Dubey et al. |
| 2003/0158737 A1 | * | 8/2003 | Csicsatka ........................ 704/273 |
| 2004/0002808 A1 | * | 1/2004 | Hashimoto et al. ............ 701/107 |

* cited by examiner

*Primary Examiner* — Vijay Chawan
(74) *Attorney, Agent, or Firm* — SNR Denton US LLP

(57) ABSTRACT

The present invention is a server-side method and apparatus that enables visually-impaired users to navigate websites and hear high-quality streaming audio of narration and descriptions of each website. The system involves creating an audible website corresponding to an original website by utilizing voice talent to read and describe web content and create audio files for each section within an original website, then assigning a hierarchy and navigation system based on the original website design. To implement the system, a small program is installed on the home page of an original website which plays a tone upon a user's visit indicating that the website is accessible with the present invention. Upon hearing the tone, a user presses a key on the keyboard to exit the original website and enter the audible website. Audible narration is played through the user's computer, reading text and describing non-text information. The narration includes menus for navigating the site which have a hierarchy substantially similar to that of the original website. Users navigate the website menus and move from website to website by making keystroke commands.

18 Claims, 5 Drawing Sheets

METHOD AND APPARATUS FOR WEBSITE NAVIGATION BY THE VISUALLY IMPAIRED

CROSS-REFERENCE TO RELATED APPLICATIONS

This application claims the benefit and is a continuation of co-pending U.S. patent application Ser. No. 10/637,970, filed Aug. 8, 2003, which claims the benefit of U.S. Provisional Application Ser. No. 60/399892, filed Jul. 31, 2002.

FIELD OF INVENTION

This invention relates generally to data processing for the purpose of navigating a computer network. More particularly, this invention relates to a method and apparatus for creating audible websites and enabling visually-impaired users to access and navigate them by keystroke.

BACKGROUND

Websites and many other computer files are created with the assumption that those who are using the files can see the file content on a computer monitor. Because websites are developed with the assumption that users can see, the sites do not convey much content audibly, nor do the sites convey navigation architecture, such as menus and navigation bars, audibly. The result is that visually-impaired users have difficulty using such websites.

Prior art systems have been developed to help visually-impaired users use websites, but these systems often require software and hardware to be installed at the user's computer. Many of these systems simply use screen reading technology alone or in combination with print magnifying software applications. The systems have shown to be costly, unwieldy, and inconvenient. Furthermore, because such technology is installed on the user's computer, visually-impaired users cannot effectively use conventional computer files anywhere except at their own computers. As a consequence, websites and other computer files are often inaccessible to visually-impaired user anywhere except at home.

Several prior art systems have been developed to overcome this problem by enabling visually-impaired users to access some computer information using any touchtone telephone. In essence, a caller accesses a special computer by telephone. The computer has access to computer files that contain audio components, which can be played back though the telephone to the user. For example, a text file that has been translated by synthetic speech software into an audio file can be played back to the user over the telephone. Some systems access audio files that have already been translated; some translate text-to-speech on the fly upon the user's command. To control which files are played, the user presses the keys on the touchtone keypad to send a sound that instructs the computer which audio file to play.

Unfortunately, these systems also have drawbacks. Large files or those having multiple nesting layers turn the system into a giant automated voice response system, which is difficult to navigate and often very frustrating. Typically only text is played back to the user. Graphics, music, images and navigation systems like those on a website are not. Furthermore, the metallic voice of the computer-generated speech does not convey meaning with inflection like a human does, and is tedious to listen to, especially for significant volumes of information.

Therefore, it is an object of this invention to provide a method and apparatus to translate computer files which have previously been created for the sighted user, particularly websites, into audio files. It is a further object to create audio files that reflect the entirety of the original file, incorporating non-text content such as graphics, music, images and navigation systems like those on a website. It is another object of this invention to provide a method and apparatus to access audio files using any conventional computer system, particularly one connected to the Internet, by locating the audio files on a central computer such as a server. It is another object of this invention to provide a keystroke navigation system to navigate audio files.

SUMMARY OF THE INVENTION

The present invention is a server-side method and apparatus that enables visually impaired users to navigate websites and hear high-quality streaming audio of narration and descriptions of each website. The system involves creating an audible website by utilizing voice talent to read and describe web content and create audio files for each section within an original website, then assigning a hierarchy and navigation system based on the original website design. To implement the system, a small program is installed on the home page of an original website which plays a tone upon a user's visit indicating that the website is accessible with the present invention. Upon hearing the tone, a user presses a key on the keyboard to exit the original website and enter the audible website. Audible narration is played through the user's computer, reading text and describing non-text information. The narration includes menus for navigating the site which have a hierarchy substantially similar to that of the original website. Other non-narrative content is included in the audible website. Users navigate the website menus and move from website to website by making keystroke commands.

DETAILED DESCRIPTION OF THE INVENTION

The present invention involves creating audio files from files created originally for sighted users. Files created originally for primarily sighted-users are referred to herein as original files. An organized collection of original files is referred to herein as an original website. The invention further involves assigning a hierarchy and navigation system to the audio files based on the original website design; accessing the audio files; and navigating the audio files.

Audio files for the present invention are created by converting text, images, sound and other rich media content of the original files into audio files through a site analysis process. A live human reads the text of the original file and the speech is recorded. The human also describes non-text file content and file navigation options aloud and this speech is recorded. Non-speech content, such as music or sound effects, is also recorded, and these various audio components are placed into one or more files. Any type of content—be it FLASH, HTML, XML, .NET, JAVA, or streaming video—can be described audibly in words, music or other sounds, and can be incorporated into the audio files. A hierarchy is assigned to each audio file based on the original computer file design such that when the audio file is played back through an audio interface, sound is given forth. The user hears substantially all of the content of the file and can navigate within the file by responding to the audible navigation clues.

The audio files are accessed via a user's computer. To implement the system, a small program is installed in an original file which will play an audible tone or other sound upon opening the file, thereby indicating that the file is accessible with the present invention. Upon hearing the sound, the user indicates to the computer to open the associated audio file. The content of the audio file is played though an audio interface, which may be incorporated into the user's computer or a standalone device.

The user navigates the audio files using a keystroke navigation system. Unlike the touchtone telephone systems which require an audio input device, the present system utilized toneless navigation.

Figure 1:
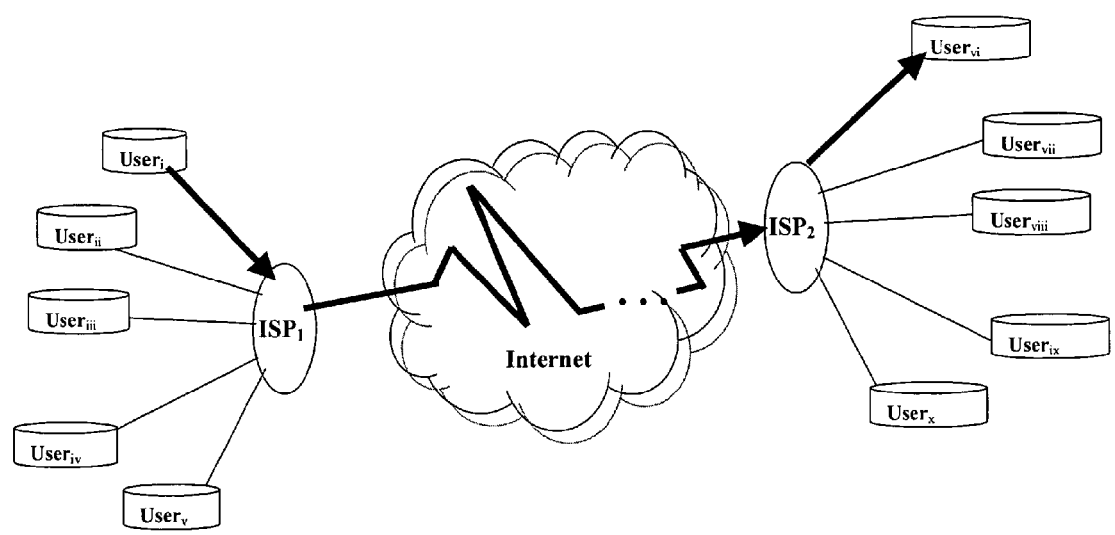
FIG. 1 illustrates the Internet.
Figure 2:
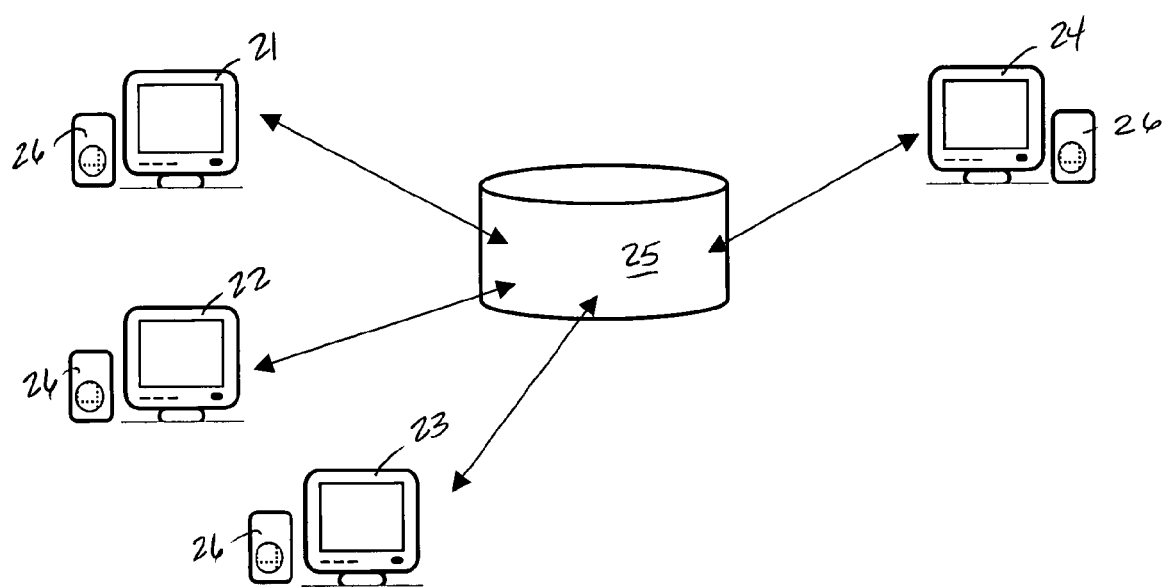
FIG. 2 illustrates a computer network.

One advantage of the present invention over prior art is that no specialized software or hardware needs to be installed on the user's computer because the audio files are installed on remote computers and accessed over a network. This type of application is commonly referred to as a server-side application, to differentiate it over a client-side, or user, application. The preferred embodiment of the present invention is applied to original web pages hosted on remote computers of a global computer network, namely the Internet. FIG. 1 illustrates a plurality of users' computers, indicated as $user_i \ldots user_x$, communicate with each other through remote computers networked together to form the Internet. Typically, users connect to the Internet via an Internet service provider, abbreviated in FIG. 1 as ISP. However, the present invention may also be used for smaller computer networks, such as local area or wide area networks. FIG. 2 illustrates such a network, where a plurality of users' computers, 21, 22, 23 and 24 communicate through a server 25. In this example, each users' computers has a standalone audio interface 26 to play audio files. Alternatively, the audio interface could be incorporated into the users' computers.

Figure 3:
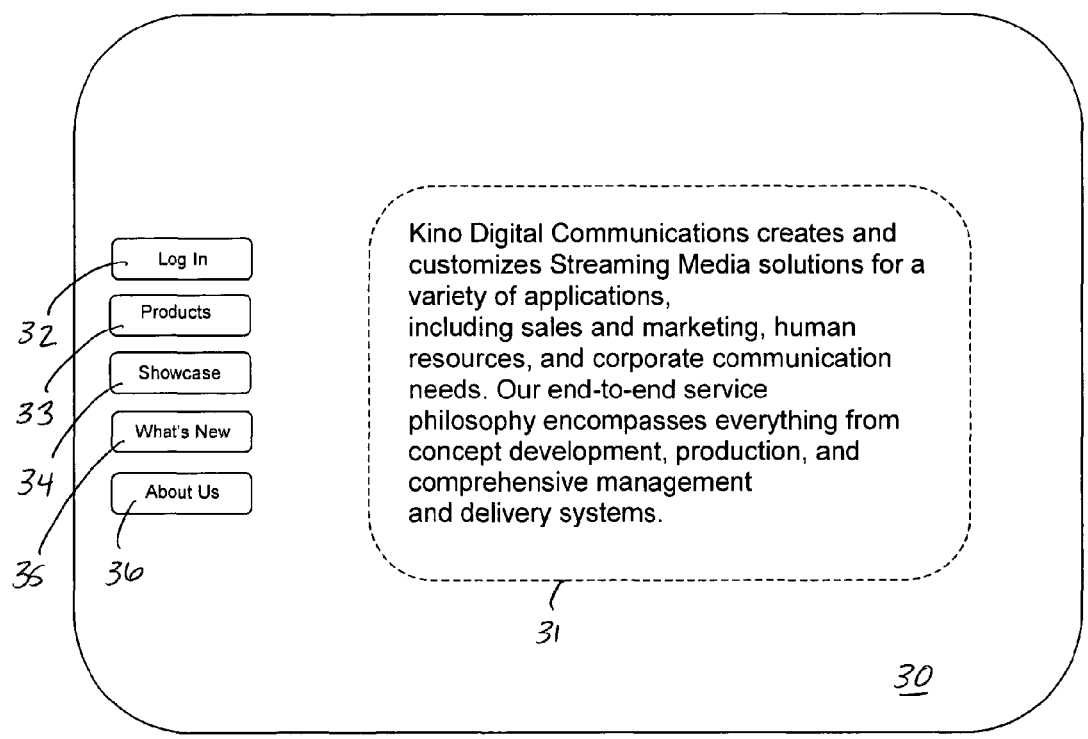
FIG. 3 illustrates a home page of an original website.

In the preferred embodiment, an original website is converted to an audible website. Each file, or page, of the original website is converted to a separate audio file, or audio page. The collection of associated audio files resides on a remote computer or server, and creates the audible website. For example, FIG. 3 illustrates the home page 30 of an original website. A live human reads aloud the text content 31 of the home page 30 and the speech is recorded into an audio file. The human says aloud the menu options 32, 33, 34, 35, 36 which are "LOG IN", "PRODUCTS", "SHOWCASE", "WHAT'S NEW", and "ABOUT US", respectively, that are visible on the original website. This speech is also recorded.

In a similar fashion, a live human reads aloud the text content and menu options of other files in the original website and the speech is recorded into audio files. In this example, key 1 is assigned to menu option 32, LOG IN; key 2 is assigned to menu option 33, PRODUCTS; key 3 is assigned to menu option 34, SHOWCASE; key 4 is assigned to menu option 35, WHAT'S NEW; key 5 is assigned to menu option 36, ABOUT US. Other visual components of the original website may also be described in speech, such as images or colors of the website, and recorded into one or more audio files. Non-visual components may also be recorded into the audio files, such as music or sound effects.

Figure 4:
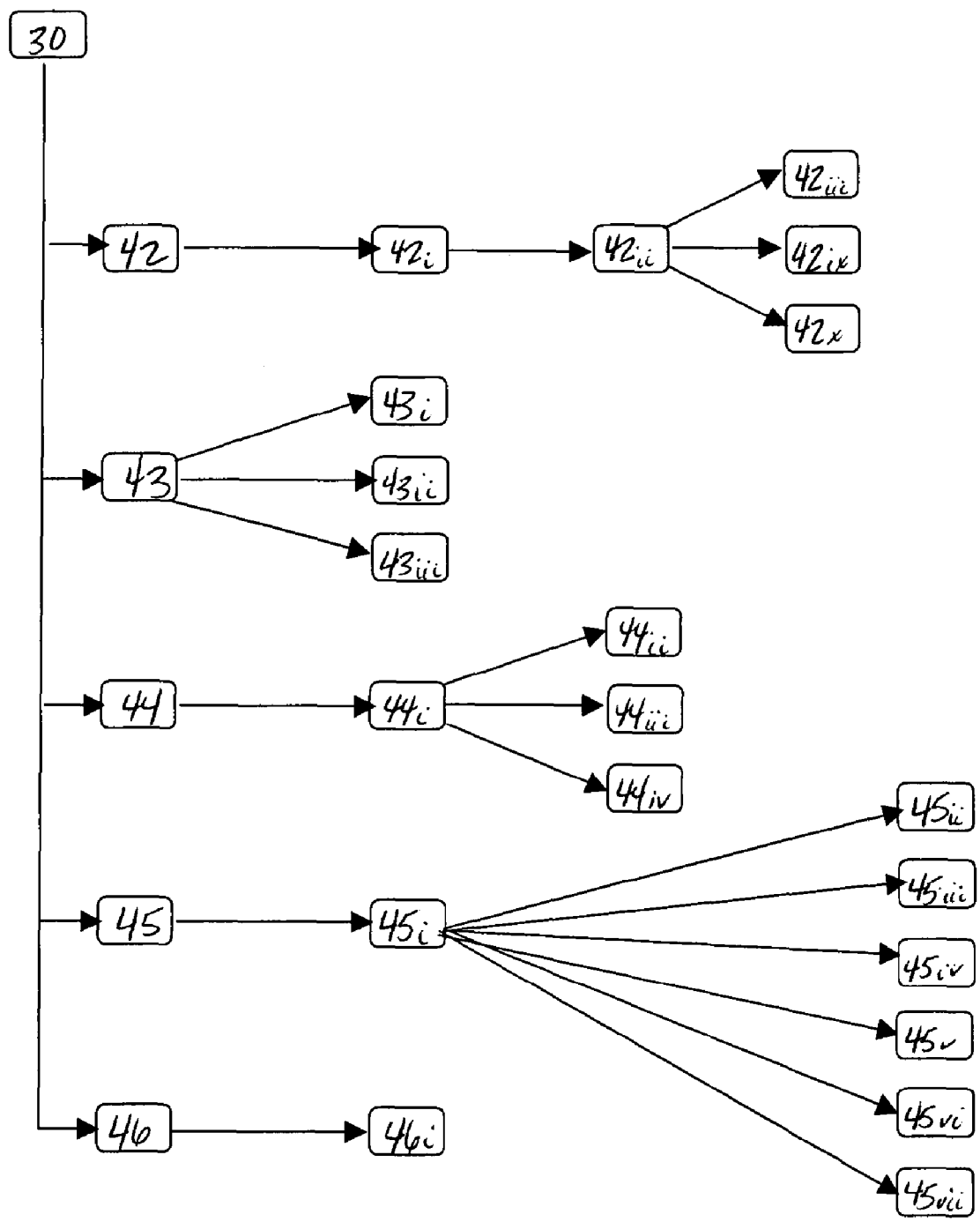
FIG. 4 illustrates the hierarchy of pages in a website.

FIG. 4 shows a hierarchy of the original files which form the original website 40. Menu option 32 will lead to the user to file 42, which in turn leads to the files $42, \ldots_v$. Menu option 33 will lead to the user to file 43, which in turn leads to the files $43, \ldots_{iii}$. Menu option 34 will lead to the user to file 44, which in turn leads to the files $44, \ldots_{iv}$ and etcetera in similar fashion for all the original files of the original website. The collection of audio files will follow a hierarchy substantially similar to that shown in FIG. 4 to form an audible website which is described audibly in its entirety.

In the preferred embodiment, a small software program is installed on the home page of an original website, which plays a tone upon a user's visit indicating that the website is accessible with the present invention. Upon hearing the tone, a user presses a key on his keyboard, preferably the "1" key, and enters the audible website. The original website may close or remain open. After pressing the "1" key, the user navigates the audible website using keystroke command system. Audible narration is played through an audio interface at the user's computer, playing text and menus and indicating which keystrokes to press to listen to the other audio web files with in the audible website. Users can navigate website menus, fast forward and rewind content, and move from website to website without visual clues.

In the preferred embodiment, the device for instructing the computer which audio file to access is a keyboard having at least eighteen keys. The keys include ten numbered menu-option keys, four directional arrow keys, a space bar, a home key, and two keys for volume adjustment. The volume keys may be left and right bracket keys. See FIG. 5. Preferably the navigation system is standard across all participating websites and the keys function as follows:

the keys numbered 1 though 9 select associated menu options 51;
the key numbered 0 selects help 52;
the up arrow selects forward navigation 53;
the down arrow selects backward navigation 54;
the right arrow key selects the next menu option 55;
the left arrow key selects the previous menu option 56;
the spacebar repeats the audio track 57;
the home key selects the main menu 58;
the right bracket key increases the volume of the audible website 59;
the left bracket key decreases the volume of the audible website 60.

Figure 5:
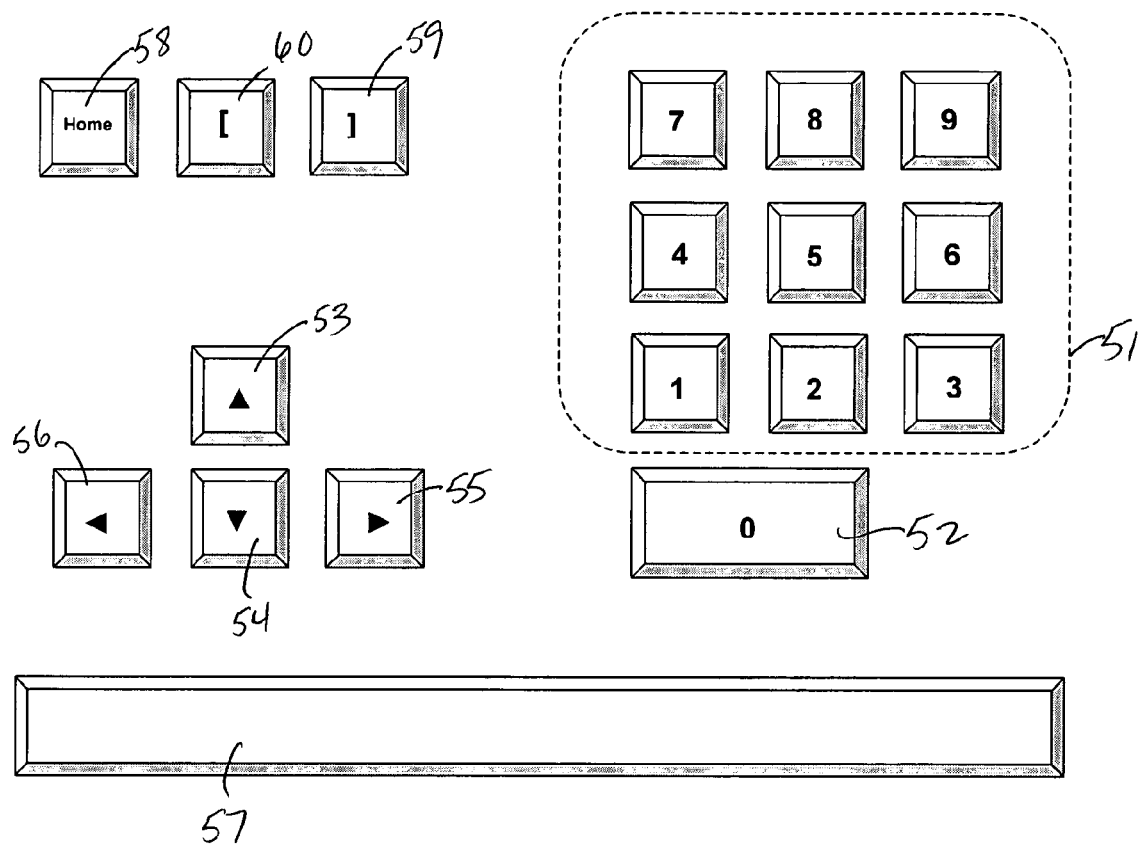
FIG. 5 illustrates the keyboard navigation system.

The keys may be arranged in clusters as shown in FIG. 5., using a standard numeric 10-key pad layout, or use alternative layouts such as a typewriter keyboard layout or numeric telephone keypad layout. Other types of devices may be used to instruct computer navigation. For example, for users who are not dexterous, a chin switch or a sip-and-puff tube can be used in place of a keyboard to navigate the audible websites.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. An apparatus for providing media content to a user over a computer network, the apparatus comprising a server in communication with the user's computer over the computer network, the server being configured to:
    a) convert the media content of one or more original files into one or more audio files prior to the user requesting the audio files, the original files comprising an original website and the audio files comprising an audio website; and
    b) provide access to the audio files to the user over the computer network.

2. The apparatus of claim 1 wherein the media content comprises text.

3. The apparatus of claim 2 wherein the media content further comprises non-text content.

4. The apparatus of claim 1 wherein the audio files reside on the server once they are created.

5. The apparatus of claim 1 wherein the audio files have a hierarchy that is substantially similar to that of the original files.

6. The apparatus of claim 5 wherein the audio files are assigned a navigation system.

7. The apparatus of claim 6 wherein the navigation system is a keystroke navigation system.

8. The apparatus of claim 5 wherein the computer network comprises the internet.

9. The apparatus of claim 8 wherein the audio files are assigned a navigation system.

10. The apparatus of claim 9 wherein the navigation system allows the user to:
    a) select menu options;
    b) advance, rewind, stop, and repeat audio files;
    c) move to the next audio file in the hierarchy; and
    d) move to the previous audio file in the hierarchy.

11. The apparatus of claim 10 wherein the navigation system is a keystroke navigation system.

12. The apparatus of claim 11 wherein one or more of the audio files comprise the menu options, and wherein the navigation system is assigned to the audio files by assigning a key on the user's input device to each menu option.

13. The apparatus of claim 12 wherein each audio file that comprises a menu option further comprises an audible indication of which key is assigned to the menu option.

14. The apparatus of claim 3 wherein converting the text and non-text content of one or more original files into one or more audio files comprises:
    a) recording a live human reading aloud the text content; and
    b) recording the live human describing aloud the non-text content.

15. The apparatus of claim 1 wherein the server is further configured to provide access to the original files.

16. The apparatus of claim 15 wherein the server is further configured to keep the original website open while providing access to the audio website.

17. The apparatus of claim 15 wherein the server is further configured to close the original website before providing access to the audio website.

18. An apparatus for providing an audio website to a user over a computer network, the apparatus comprising:
    a) an original website comprising text and non-text content, the original website being accessible by the user with a computer connected to the computer network;
    b) a computer program installed on the original website, the computer program configured to play a sound when the user accesses the original website, the sound indicating that the audio website is available; and
    c) a server connected to the user's computer through the computer network, the server configured to convert the text and non-text content of the original website into audio files comprising the audio website prior to the user requesting the audio website, the audio files residing on the server and the converting comprising:
       1. assigning a hierarchy to the audio files, the hierarchy being substantially similar to that of the original website; and
       2. assigning a keystroke navigation system to the audio files, the keystroke navigation system comprising assignments of keys on the user's input device to menu options of files in the original website.

* * * * *